United States Patent
Gomm

(10) Patent No.: US 7,028,207 B2
(45) Date of Patent: Apr. 11, 2006

(54) MEASURE CONTROLLED DELAY WITH DUTY CYCLE CONTROL

(75) Inventor: Tyler J. Gomm, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 622 days.

(21) Appl. No.: 10/225,771

(22) Filed: Aug. 22, 2002

(65) Prior Publication Data
US 2004/0039955 A1    Feb. 26, 2004

(51) Int. Cl.
*G06F 1/12* (2006.01)

(52) U.S. Cl. .................. 713/401; 711/104; 711/167
(58) Field of Classification Search ............... 713/401
See application file for complete search history.

(56) References Cited

U.S. PATENT DOCUMENTS

| | | | | |
|---|---|---|---|---|
| 5,306,971 | A * | 4/1994 | McCune | 327/270 |
| 6,323,705 | B1 * | 11/2001 | Shieh et al. | 327/158 |
| 6,380,800 | B1 * | 4/2002 | Huber | 327/552 |
| 6,687,629 | B1 * | 2/2004 | Yamaguchi et al. | 702/69 |

* cited by examiner

*Primary Examiner*—Lynne H. Browne
*Assistant Examiner*—Anand B. Patel
(74) *Attorney, Agent, or Firm*—Fletcher Yoder

(57) ABSTRACT

The disclosed embodiments relate to circuits that produce synchronized output signals. An input signal is received and used to produce a delayed input signal. The period of the input signal and the phase difference between the input signal and the delayed input signal are measured. The period of the input signal and the phase difference between the input signal and the delayed input signal are used to construct an output signal.

55 Claims, 7 Drawing Sheets

MEASURE CONTROLLED DELAY WITH DUTY CYCLE CONTROL

BACKGROUND OF THE INVENTION

1. Field of the Invention

The present invention relates generally to improving the performance of integrated circuit devices and, more particularly, to circuits that produce synchronized output signals.

2. Description of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Microprocessor-controlled integrated circuits are used in a wide variety of applications. Such applications include personal computers, vehicle control systems, telephone networks, and a host of consumer products. As is well known, microprocessors are complex integrated circuit devices that perform specific functions under the control of a software program. This program is stored in a memory device which is coupled to the microprocessor. Not only does the microprocessor access memory devices to retrieve the program instructions, but it also stores and retrieves data created during execution of the program in one or more memory devices.

There are a variety of different memory devices available for use in microprocessor-based systems. The type of memory device chosen for a specific function within a microprocessor-based system generally depends upon which features of the memory are best suited to perform the particular function. Memory manufacturers, such as the present assignee, provide an array of innovative fast memory chips for various applications, including dynamic random access memory (DRAM) and static random access memory (SRAM). DRAM is relatively inexpensive to produce compared to SRAM, but SRAM typically operates at faster speeds. Additionally, DRAM usually must be continually refreshed or it will lose its data. SRAM on the other hand retains stored data as long as power is applied to it.

Although both DRAM and SRAM are making significant gains in speed and bandwidth, increases in the operating speeds of microprocessors necessitate ever-increasing performance requirements for memory devices of all types. Regardless of the type of memory, the solution for providing adequate memory bandwidth depends on many factors. Examples of such factors include the system architecture in which the memory is to be deployed, the design goals of the specific application, and the processor that is employed with the memory. All of these factors and a host of others contribute to the decision of which memory to use for a given application.

Obstacles to making memory chips faster include synchronization problems, signal delay within the chip, the package design, power consumption requirements, and the like. Many of these problems become more pronounced as desired operating speeds increase. Thus, significant research and development has been devoted to finding faster ways to access memory and to reduce or hide latency associated with memory accesses.

One type of memory device that may contribute to increased processing speeds in computer systems is the Synchronous Dynamic Random Access Memory (SDRAM). An SDRAM differs from a standard DRAM in that the SDRAM includes input and output latches to hold information from and for the processor. Data is strobed into or out of the SDRAM device in synchronization with the system clock. An SDRAM allows the system processor to save wait states because input information to the SDRAM (i.e., addresses, data, and controls signals) is latched, thus allowing the processor to perform other tasks while waiting for the SDRAM to finish its task of storing or retrieving relevant data. After a predetermined number of clock cycles during which the SDRAM is processing the processor's request, the processor may return to the SDRAM and obtain the requested information from the output latches.

A technique for increasing the speed of an SDRAM is to implement a Double Data Rate (DDR) SDRAM. In a DDR memory device, the data transfer rate is twice that of a regular memory device, because the input/output data of the DDR can be strobed twice for every clock cycle. That is, data is sent on both the rising and falling edges of the clock signal rather than just the rising edge of the clock signal as in typical Single Data Rate (SDR) systems. However, because the DDR technology utilizes both the rising and falling edges of the clock signal, problems may arise in obtaining proper setup and latch times for the data if an "unclean" clock signal is used. For example, the clock signal may become distorted or skewed as it passes through certain elements, i.e. input buffers. This may adversely affect the clock signal such that data latching times are not achieved.

In high speed memory devices such as DDR SDRAMs, the timing of the clock signal is important. The clock that is used to strobe the SDRAM is synchronized with other signals, which may be external to the SDRAM. Several known methods of synchronizing signals exist today. In one method, a delay locked loop (DLL) circuit is used. The DLL circuit creates an output signal that is matched in terms of frequency and/or phase to the input signal, which may be an external clock signal, for example. In DLL circuits, an input buffer receives an input signal and transmits the signal to a delay line. Generally, the delay line consists of a number of delay elements, such as inverters. The output signal from the delay line is compared to the input signal, and the number of delay elements is adjusted by a shift register or counter until the input and the output signals are equal.

A second known synchronization method utilizes a synchronous mirror delay (SMD) circuit which forces the input signal through a forward path delay line. However, the SMD circuit forces the output clock signal through a reverse path delay line as well. Similarly, the input signal and the output signal are compared, and adjustments to the delay lines are made until the input and output signal are equal.

Finally, a third known synchronization circuit may be referred to as a measure controlled delay (MCD). The MCD circuit measures the offset between the input signal and an output signal and adjusts a delay line to force the two signals into alignment.

However, the preceding synchronization circuits are incapable of producing a synchronous output signal with a different duty cycle from the input signal or producing a clean synchronous output signal based on an unclean input signal. As discussed previously, an unclean signal may not allow the proper latch times to be achieved for DDR components.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation may be described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
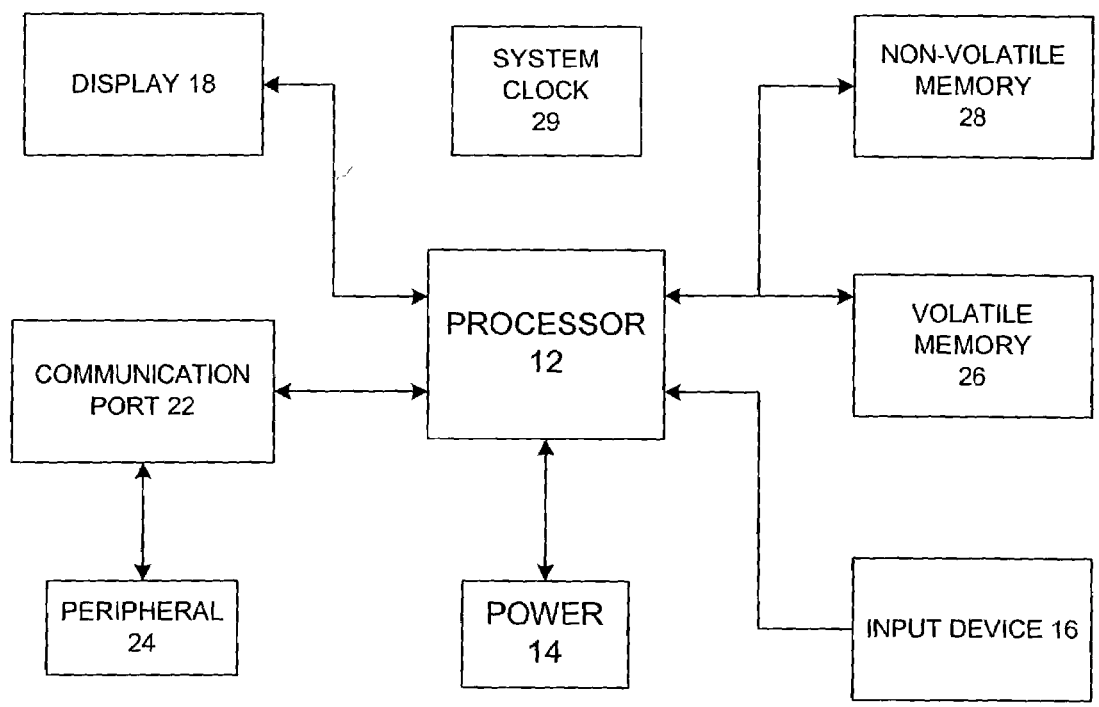
FIG. 1 is a block diagram of an electronic device that may incorporate embodiments of the present invention.

Turning now to the drawings, FIG. 1 is a block diagram of an electronic device that may incorporate embodiments of the present invention. The electronic device is generally designated by the reference numeral 10. The electronic device 10 may be any of a variety of different types, such as a computer, pager, cellular telephone, personal organizer, etc. In a typical processor-based device, a processor 12, such as a microprocessor, executes software to control the operation of the device 10.

The device 10 typically includes a power supply 14. For instance, if the device 10 is portable, the power supply 14 would advantageously include permanent batteries, replaceable batteries, and/or rechargeable batteries. The power supply 14 may also include an AC adapter, so that the device may be plugged into a wall outlet. In fact, the power supply 14 may also include a DC adapter, so that the device 10 may be plugged into a source of DC power such as the cigarette lighter receptacle in a vehicle.

Various other devices may be coupled to the processor 12, depending upon the functions that the device 10 performs. For instance, an input device 16 may be coupled to the processor 12. The input device 16 may include any type of device that allows a user to issue commands to the device 10. Examples of typical input devices include buttons, switches, a keyboard, a light pen, a mouse, and/or a voice recognition system. A display 18 may also be coupled to the processor 12. The display 18 may include an LCD display, a CRT, LEDs, and/or an audio display. A communication port 22 may also be coupled to the processor 12. The communication port 22 may be adapted to be coupled to a peripheral device 24, such as a modem, a printer, or a computer, for instance, or to a network, such as a local area network or the Internet.

Because the processor 12 controls the functioning of the device 10 generally under the control of software programming, memory is coupled to the processor 12 to store and facilitate execution of the software program. For instance, the processor 12 may be coupled to volatile memory 26, which may include dynamic random access memory (DRAM), synchronous dynamic random access memory (SDRAM), static random access memory (SRAM), Double Data Rate (DDR) memory or the like. The processor 12 may also be coupled to non-volatile memory 28. The non-volatile memory 28 may include a read only memory (ROM), such as an EPROM or Flash Memory, to be used in conjunction with the volatile memory. The size of the ROM is typically selected to be just large enough to store any necessary operating system, application programs, and fixed data. The volatile memory, on the other hand, is typically quite large so that it can store dynamically loaded applications. Additionally, the non-volatile memory 28 may include a high capacity memory such as a disk drive, tape drive memory, CD ROM drive, DVD, read/write CD ROM drive, and/or a floppy disk drive.

The volatile memory 26 may include a number of SDRAMs which may implement DDR technology. As mentioned previously, the SDRAM differs from a DRAM in that the SDRAM is controlled synchronously with a timing source, such as the system clock 29. To accomplish synchronous control, latches are used to provide data and other information on the inputs and outputs of the SDRAM. Thus, in a read operation for example, the processor 12 may retrieve data from a data output latch a predetermined number of clock cycles after issuing the read request. The predetermined number of clock cycles typically corresponds to the amount of time used to access the requested data, move the data to the output latch, and allow the data to stabilize. The data is clocked out of the output latch synchronous with the system clock which provides the timing source for the processor 12. Similarly, write operations also are performed synchronous with a timing source, such as the system clock or other externally provided timing source. Thus, data may be clocked into an input latch and written to the memory array under control of a write clock provided from the external device which is performing the write operation.

The clock signal used for synchronization has a period which may be defined to correspond to a 360 degree clock pulse. Data may be transferred, as previously discussed, on both the rising and the falling edges of the clock signal in a DDR component. To maximize the likelihood of capturing data, it may be beneficial to clean the clock signal or vary the duty cycle of the clock signal such that the clock signal is at its peak for at least the minimum time required for the data to latch. In certain instances, it may also be beneficial to produce a plurality of clock signals such that the data can be propagated in a forward manner by precluding the strobing of latches prior to the stabilization of the data.

Figure 2:
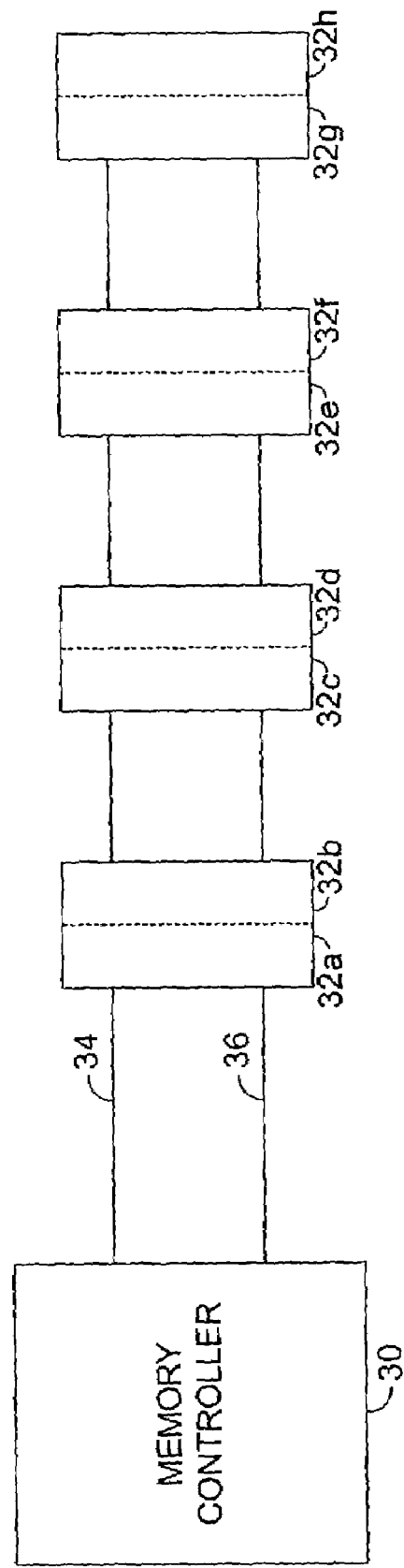
FIG. 2 is a block diagram of a memory subsystem that may be deployed in the electronic device shown in FIG. 1.

FIG. 2 is a block diagram of a memory subsystem that may be deployed in the electronic device shown in FIG. 1. A memory controller 30 is generally provided to facilitate access to the volatile memory 26, which may be disposed in one or more memory slots 32a–32h. One or more of the memory slots 32a–32h may be populated with a separate volatile memory device (not shown).

While FIG. 2 illustrates the memory controller 30 as existing in a separate integrated circuit device, the memory controller 30 may be integrated with the processor 12, as can be appreciated by those of ordinary skill in the art. The memory controller 30 may receive requests to access the volatile memory 26 from one or more processors, such as the processor 12. Additionally, the memory controller 30 may receive memory access requests from peripheral devices, such as the peripheral device 24, and/or from other systems. As previously discussed, the memory controller 30 is generally tasked with facilitating the execution of the requests to the memory devices and coordinating the exchange of information, including configuration information, to and from memory devices disposed in the memory slots 32a–32h.

The memory buses may include a memory data bus 34 to facilitate the exchange of data between each memory device and the memory controller 30. The memory data bus 34 may comprise a plurality of single bit data buses each coupled from the memory controller 30 to an individual memory device. In one configuration of the volatile memory 26, the memory data bus 34 may include individual data buses 38. In that configuration, each of the eight memory slots 32a–32h is capable of supporting a module comprising eight individual memory devices. Further, the memory data bus 34 may include one or more individual buses to each memory rank 32a–32h which may be used for error detection and correction (ECC). As can be appreciated by those skilled in the art, the individual buses in the memory data bus 34 will vary depending on the configuration and capabilities of the system 10. The configuration of the memory buses is a matter of design choice and not a crucial aspect of the present invention.

The volatile memory 26 may also include a command bus 36 on which address information such as command address (CA), row address select (RAS), column address select (CAS), write enable (WE), bank address (BA), and chip select (CS), for example, may be delivered for a corresponding request. Further, the command bus 36 may also be used to facilitate the exchange of configuration information at boot-up, as previously. As with the memory data bus 34, the command bus 36 may actually comprise a plurality of individual command buses. A single command bus may be provided for each corresponding memory device on each corresponding memory module. In the illustrated configuration, the command bus may include 20 individual buses. Further, the command bus 36 may include an ECC bus for each memory slot 32a–32h. As previously explained with reference to the memory data bus 34, a variety of configurations may be implemented for the command bus 36 depending on the system requirements and specifications. The exact implementation of the command bus is not a crucial aspect of the present invention.

Figure 3:
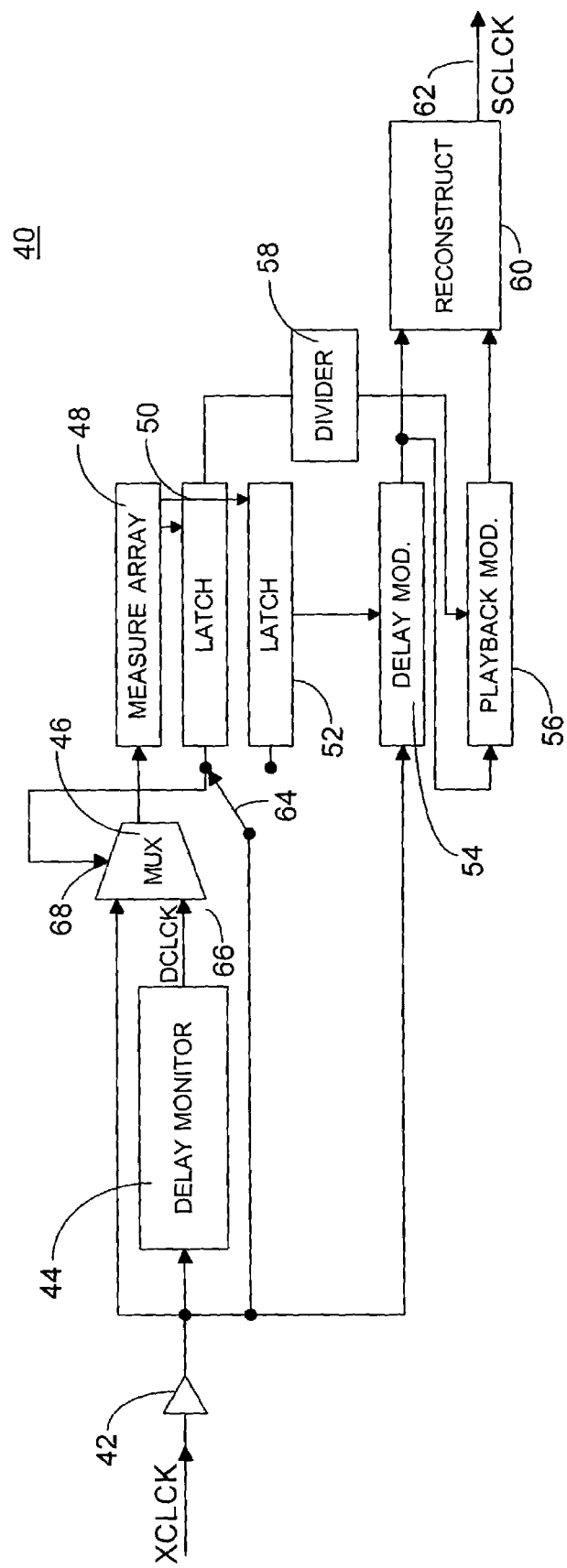
FIG. 3 is a block diagram of an exemplary embodiment of a synchronization device according to the present invention.

FIG. 3 is a block diagram of an embodiment of a synchronization circuit 40 according to the present invention. The synchronization circuit 40 is capable of producing a clean, synchronous output signal with a varied duty cycle relative to the input signal. The synchronization circuit 40 includes a measure array 48 which, when used in conjunction with a multiplexer 46 and a timing switch 64, is capable of measuring the period of the input signal (XCLCK) and measuring the difference between XCLCK and a DCLCK signal 66. The DCLCK signal 66 is created by passing the XCLCK signal through a delay monitor 44. The values of the period of XCLCK and the difference between XCLCK and DCLCK are stored, respectively, in a latch 50 and a latch 52 in binary word format. As discussed in further detail below, the values stored in the latches 50, 52 may be mathematically manipulated by a divider circuit 58. The value of the period of XCLCK may be referred to by the designation tCK. The manipulation of tCK allows the synchronization device 40 to reproduce a clean clock signal with a varied duty cycle.

Generally, the synchronization circuit 40 receives the XCLCK signal at an input buffer 42. The output of the input buffer 42 is coupled to a multiplexer 46, a delay monitor 44, a timing switch 64, and a delay playback module 54. Both the XCLCK signal and the DCLCK signal 66 are received by the multiplexer 46. The multiplexer control input 68 determines which signal the multiplexer 46 will be providing to the measure array 48. For instance, when the XCLCK signal is provided to the measure array 48, tCK is measured, and the value is latched and stored in a tCK latch 50. Moreover, when the XCLCK signal is provided to the measure array 48, the timing switch 64 is positioned such that the tCK latch 50 is triggered by the XCLCK signal. In contrast, when the DCLCK signal 66 is provided to the measure delay array 48, the difference between the phases of the XCLCK signal and the DCLCK signal 66 is measured, and the value is latched and stored in a delay latch 52. Moreover, when the DCLCK signal 66 is provided to the measure delay array 48, the timing switch 64 is positioned such that the delay latch 52 is triggered by the XCLCK signal.

The output of the tCK latch 50 is coupled to a divider circuit 58, thereby providing the divider circuit 58 with the tCK value in binary word format. As previously discussed, the divider circuit 58 is capable of mathematically manipulating tCK in accordance with the following equation:

$$tCK/n$$

For instance, if the desired output signal has a duty cycle of 50%, then the divider circuit 58 divides tCK by two. In doing so, the divider circuit in effect calculates the midpoint of the period of the input signal which corresponds to 180 degrees of the 360 degree period. Similarly, if the desired output signal has a 25% duty cycle, then the divider circuit 58 divides tCK by four which corresponds to a 90 degree phase angle. Essentially, the divider circuit 58 may produce an output signal with any desired duty cycle.

The divider circuit 58 is coupled to a playback module 56, thereby providing the tCK/n value to the playback module 56. The delay latch 52 is coupled to the delay playback module 54, thereby providing the value of the measured difference between the phases of the XCLCK and DCLCK signals to the delay playback module 54. The playback module 56 and the delay playback module 54 both comprise delay lines. The delay lines are adjusted with the values provided by the divider circuit 58 and the delay measure latch 52 respectively. For instance, if a difference existed between the XCLCK signal and the DCLCK signal 66, the delay latch 52 would adjust the number of delay elements used in the delay line of the delay playback module 54 until the rising edges of the XCLCK signal and the DCLCK signals were equal in phase. Similarly, the divider circuit 58 adjusts the delay within the delay line of the playback module 56. However, the delay line within the playback module 56 is adjusted such that the period of time between the rising and falling edge of the output signal create the desired duty cycle.

Both the delay playback module 54 and the playback module 56 are coupled to a reconstruct circuit 60. The reconstruct circuit 60 may be a logic function, which may comprise a NOR-based set/reset flip-flop. Other logic components, however, may be implemented in order to reconstruct the output signal. The exact configuration of the reconstruct circuit 60 is not believed to be a crucial aspect of the present invention. Because the output of the delay playback module 54 is coupled to the input of the playback module 56, the delay playback module 54 creates the synchronous rising edge of the output signal while the playback module 56 creates the falling edge of the output signal. The output signal is thereby cleaned regardless of the uncleanness of the input signal.

With regard to the timing switch 64, there are many design options for its control. The control of switch 64 is a design choice and not believed to be a crucial aspect of the invention. Some of the relevant considerations are the consistency of the XCLCK signal and the power constraints on the timing synchronization device. For instance, if the XCLCK signal were measured every other cycle, the power used would increase tremendously. In addition, every measurement causes noise to be generated within the system. Therefore, the measurement of XCLCK every other cycle may cause significant problems. Thus, it is recommended that the XCLCK signal be measured sparingly. A suggestion is that the XCLK signal be measured every 10 cycles, while the DCLCK signal 66 is measured every three cycles.

Figure 4:
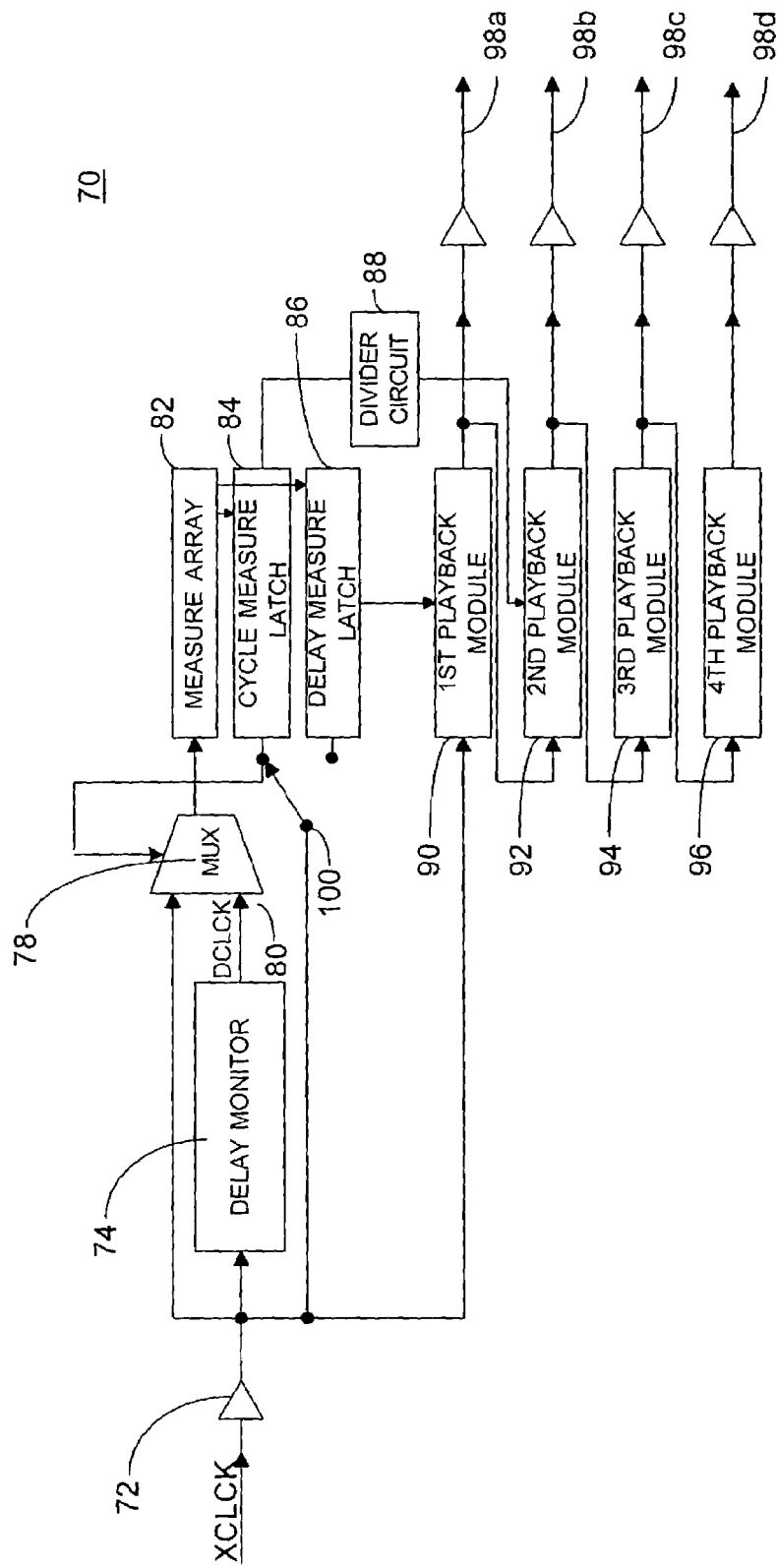
FIG. 4 is a block diagram of another embodiment of a synchronization device according to the present invention.

FIG. 4 is a block diagram of another embodiment of the present invention. The synchronization circuit 70 is capable of creating a plurality of clock signals with varied phase angles. Similar to the block diagram of the synchronization circuit in FIG. 3, this synchronization circuit 70 includes a measure array 82 which, when used in conjunction with a multiplexer 78 and a timing switch 100, can measure tCK and the difference in phase angles between the XCLCK and a DCLCK signal 80 (created by passing the XCLCK signal through the delay monitor 74). These values are further stored in their respective latches in binary word format, namely a cycle measure latch 84 and a delay measure latch 86 respectively. As discussed in more detail below, because tCK is latched in binary word format, tCK can be mathematically manipulated by a divider circuit 88. The synchronization circuit 70 comprises a first, second, third, and fourth playback module, 90, 92, 94, and 96 respectively. The playback modules 90, 92, 94, 96 adapted to provide output signals to output buffers 98a, 98b, 98c, and 98d, respectively.

The synchronization circuit 70 receives the XCLCK signal at an input buffer 72. The output of the input buffer 72 is coupled to a multiplexer 78, a delay monitor 74, a timing switch 100, and a first playback module 90. Both the XCLCK signal and the DCLCK signal 80 are received by the multiplexer 78. The multiplexer control input 76 determines which signal the multiplexer 78 will provide to the measure delay array 82. For instance, when the XCLCK signal is provided to the measure array 82, tCK is measured, and the value is latched and stored in the cycle latch 84. Moreover, the timing switch 100 is positioned such that the cycle measure latch 84 is triggered by the XCLCK signal when measuring tCK. In contrast, when the DCLCK signal 80 is provided to the measure delay array 82, the phase angle difference between the XCLCK signal and the DCLCK signal is measured, and the value is latched and stored in the delay latch 86. Moreover, when the DCLCK signal 80 is allowed access to the measure array 82, the timing switch 100 is positioned such that the delay latch 84 is triggered by the XCLCK signal.

The output of the cycle measure latch 84 is coupled to a divider circuit 88, thereby providing the divider circuit 88 with the value of tCK in binary word format. As previously discussed, the divider circuit 88 is capable of mathematically manipulating tCK to produce varying duty cycles. In general, the divider circuit 88 performs a general function of:

$$tCK/n$$

For instance, if the desired operation were to produce a quadrature clock with rising edges staggered at 90 degrees apart, then the divider circuit 88 would divide tCK by four. This would produce four output signals with the following phase angles: 0 degrees at output buffer 98a; 90 degrees at output buffer 98b; 180 degrees at output buffer 98c; and 270 degrees at output buffer 98d. In contrast, if the desired outputs were to be 120 degrees out of phase, then the divider circuit 88 would divide tCK by three.

The divider circuit 88 as depicted in the embodiment shown in FIG. 4 comprises a single output. However, the divider circuit 88 may comprise a plurality of outputs or the synchronization device 70 may comprise a plurality of divider circuits 88 in which case an unlimited number of combinations of variable duty cycled clocks could be produced. In addition, the number of playback modules may vary depending on the mathematical manipulation desired. For instance, if the desired stagger between outputs were 120 degrees, then three signals would be produced at 120 degree phase angle differences for each signal.

The divider circuit 88 provides the tCK/n value to the second playback module 92. The delay measure latch 86 provides the offset measurement, as previously discussed, to the first playback module 90. The first playback module 90, second playback module 92, third playback module 94, and fourth playback module 96 comprise delay lines. The delay lines are adjusted with the values provided by the delay latch 86 and the divider circuit 88. Specifically, the divider circuit 88 adjusts the delay lines for the second playback module 92, third playback module 94, and the fourth playback module 96. The delay latch 86 adjusts the delay line of the first playback module 90 so that XCLCK and DCLCK signals are synchronous.

The playback modules are coupled such that the output of the first playback module 90 is coupled to the second playback module 92, the output of the second playback module 92 is coupled to the third playback module 94, and the output of the third playback module 94 is coupled to the fourth playback module 96. Similarly, the same result could be achieved if the playback modules, 90, 92, 94, and 96 were connected in parallel, i.e. the output of the first playback module 90 is connected to the inputs of the second playback module 92, the third playback module 94, and the fourth playback module 96. The delay lines would be adjusted according to the desired clock signal output. For instance, if quadrature clock signals were desired, then the delay of the second playback module's delay line would be controlled such that it would correspond to 25% of tCK. Similarly, the delay lines of the third and fourth playback modules would be adjusted to correspond to 50% of tCK and 75% of tCK respectively.

The measure array, delay latch, and delay playback module (listed as first playback module in FIG. 4), of the previously discussed synchronization circuits, may utilize latches, shift registers, counters, look up tables and/or state machines to synchronize the XCLCK signal with the DCLCK signal.

With regard to the timing switch 100, there are many design options for its control. Some of the relevant considerations are the consistency of the XCLCK signal and the power constraints on the timing synchronization device. For instance, if the XCLCK signal were measured every other cycle, the power used would increase tremendously. In addition, every measurement causes noise to be generated within the system; therefore, the measurement of XCLCK every other cycle may cause significant problems. Thus, it is recommended that the XCLCK signal be measured sparingly. A suggestion is that the XCLK signal be measured every 10 cycles, while the DCLCK signal 80 is measured every three cycles.

Furthermore, a reconstruct circuit, similar to that described in the embodiment illustrated in FIG. 3, may be added to FIG. 4 such that the output signal phase angles and duty cycles could be adjusted as desired. In this manner a limitless number of output signals could be produced with varied duty cycles as well as phase angles.

The preceding embodiments, specifically with reference to the embodiment of FIGS. 3 and 4, the timing switch may be replaced with a dedicated measure array for each measured value. Thus, the value of tCK and the phase angle difference may be measured constantly. Moreover, additional divider circuits could be implemented such that a limitless number of duty cycle and phase angle variations could be produced.

Figure 5:
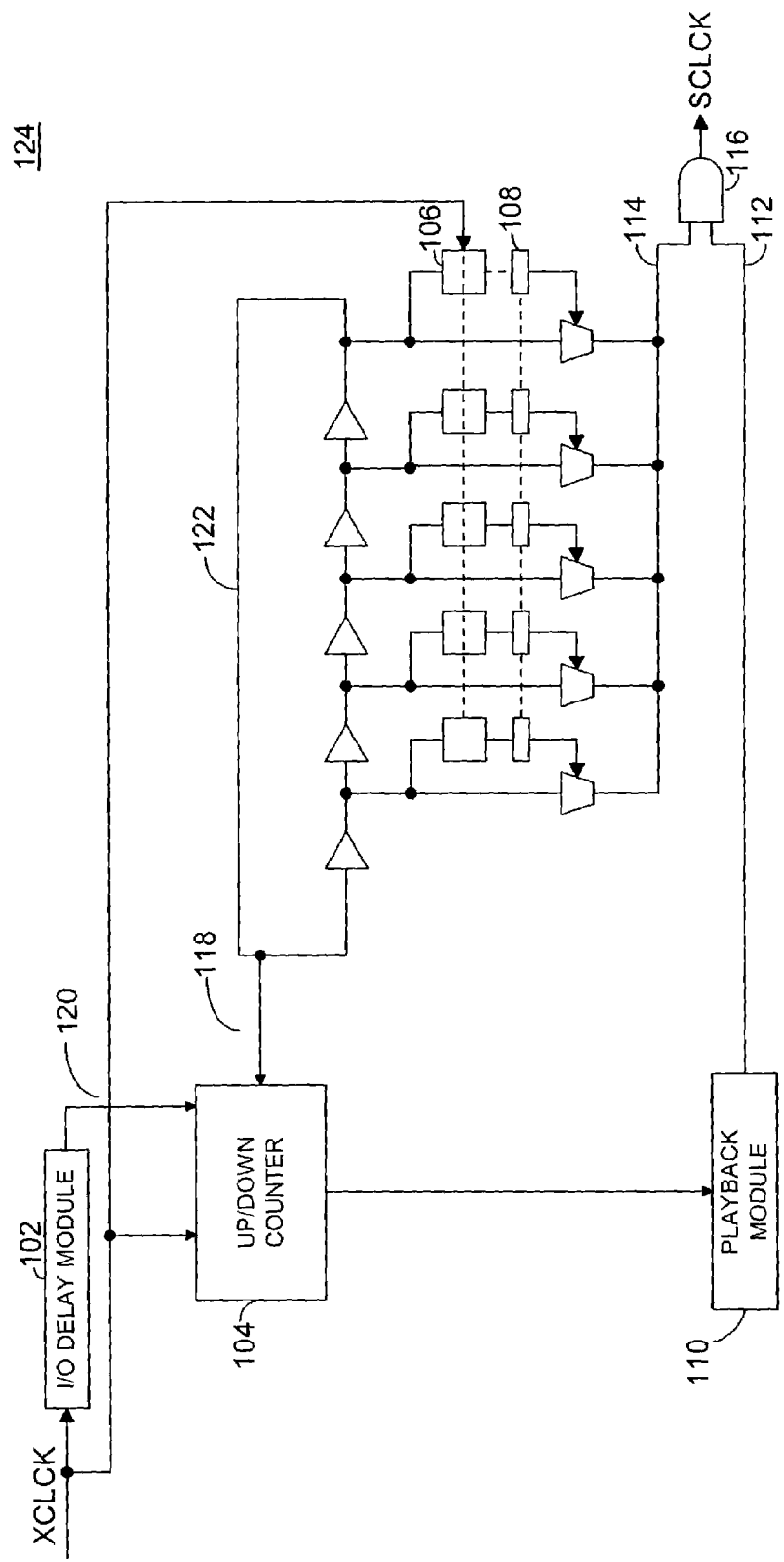
FIG. 5 is a block diagram of an embodiment of a circuit that may be used in the embodiments illustrated in FIG. 3 and FIG. 4.

FIG. 5 is a block diagram of a synchronization circuit that may be adapted for use in the preceding synchronization circuits. Specifically, exemplary embodiments of the measure array, delay latch and delay playback module are illustrated in FIG. 5. A synchronization circuit 124 may measure the phase angle difference between the XCLCK and the DCLCK signal (created by passing the Nth XCLCK cycle through an I/O delay module 102) to a very high resolution. The synchronization circuit 124 employs a ring oscillator 122 in conjunction with an up/down counter 104 to produce a coarse timing signal 112 and a fine timing signal 114. The output of the counter 104 is delivered to a playback module 110, which delivers the coarse timing signal 112 to an AND gate 116. The SCLCK signal is output when the coarse timing signal 112 and fine timing signal 114 are at a predetermined logic level (e.g. a logical high or "1"), thereby inducing a predetermined corresponding output from the AND gate 116.

An XCLCK signal, as previously discussed, is provided to the delay module 102. The counter 104 receives both the DCLCK signal 120 and the XCLCK signal and measures the difference between the two. The counter 104 may then be reversed, allowing a plurality of latches 106 to be strobed by the XCLCK signal. When the latches 106 are strobed, the current transition point in the ring oscillator 122 is stored. A plurality of transform blocks 108 represent a transform: out(n)=out (total ring elements−n). The coarse timing signal 112 is asserted when the up/down counter is equal to zero.

Figure 6:
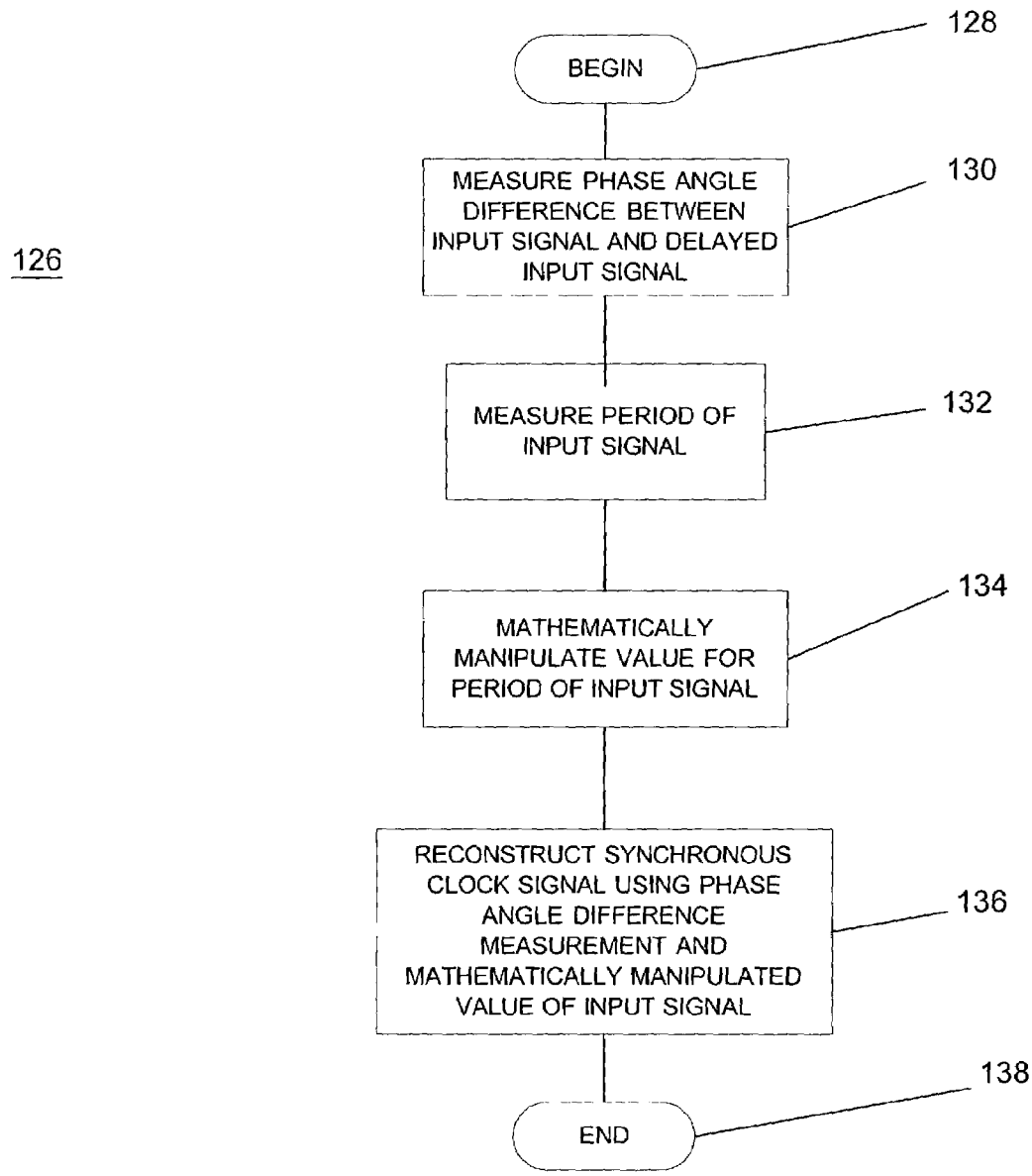
FIG. 6 is a process flow diagram showing the operation of one embodiment of the present invention.

FIG. 6 is a process flow diagram showing the operation of one embodiment of the present invention. The process 126 begins with the measurement of the phase angle difference between the output signal and the input signal (block 130). In order to perform this measurement, the timing switch, as discussed previously, should be in the proper position. Then tCK of the external clock, XCLCK, is measured (block 132). The synchronization device, as discussed previously, allows tCK to be mathematically manipulated or divided (block 134). The delay measurement can be used to reconstruct the rising edge of the clock and the tCK/n value can be used to construct the falling edge of the clock (block 136).

Figure 7:
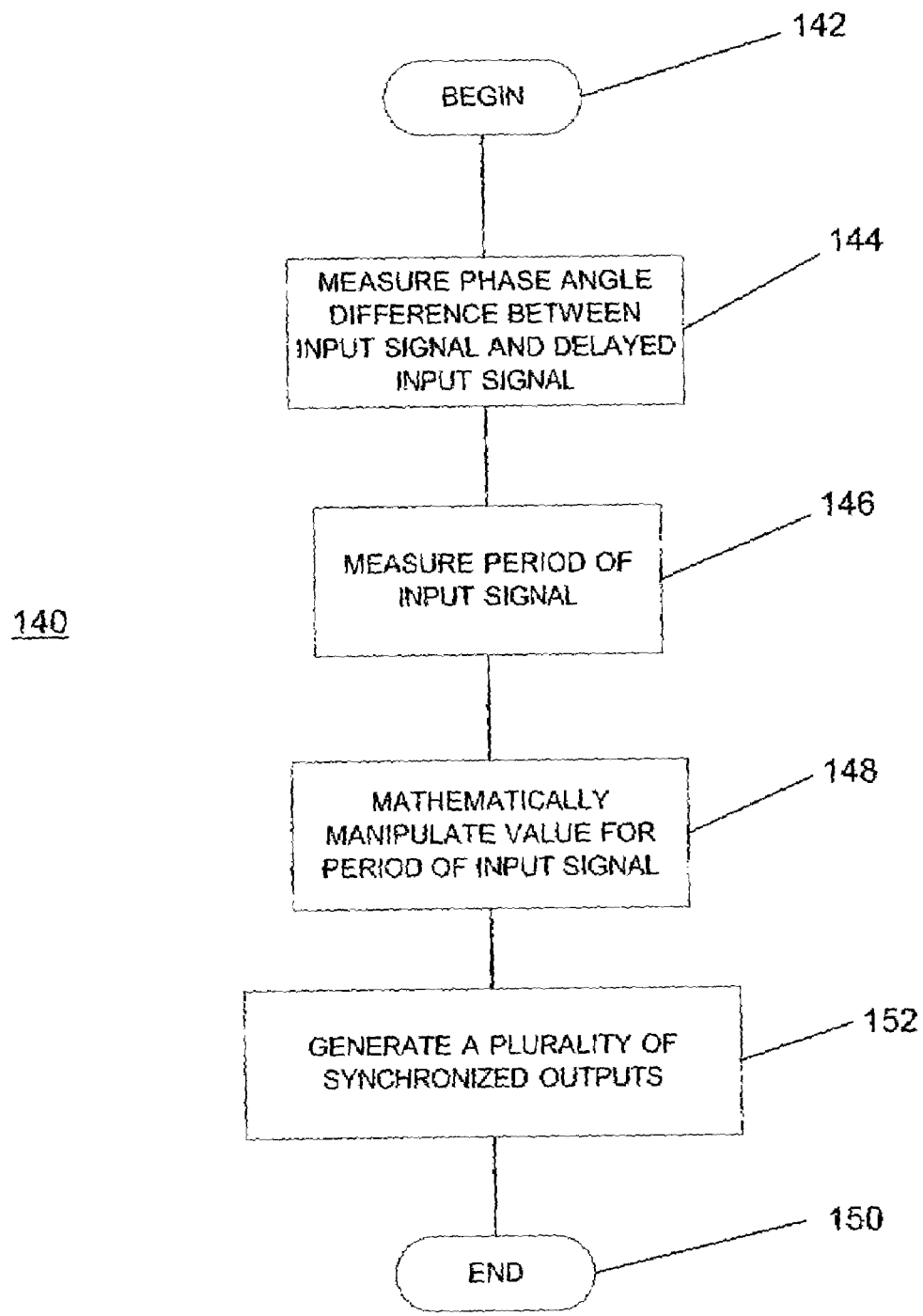
FIG. 7 is a process flow diagram showing the operation of another embodiment of the present invention.

FIG. 7 is a process flow diagram showing the operation of another embodiment of the present invention. The process 140 begins with the measurement of the phase angle difference between the output signal and the input signal (block 144). In order to perform this measurement, the timing switch, as discussed previously, should be in the proper position. Then, tCK of the input signal is measured (block 146). The synchronization device, as discussed previously, allows tCK to be mathematically manipulated or divided (block 148). The measurement of the phase angle difference between the output signal and the input signal can be used to generate a plurality of outputs properly synchronized and scaled (block 150).

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A synchronization circuit that is adapted to receive an input signal, the synchronization circuit comprising:
   a delay monitor adapted to produce a delayed input signal;
   a measuring circuit adapted to measure the period of the input signal and a phase difference between the input signal and the delayed input signal;
   a manipulation circuit adapted to manipulate the period of the input signal to produce a manipulated value; and
   a reconstruction circuit adapted to receive the manipulated value and the phase difference between the input signal and the delayed input signal and to produce a signal having a duty cycle that corresponds to the manipulated value.

2. The synchronization circuit of claim 1, comprising a timing switch adapted to (a) measure the period of the input signal in a first position and (b) measure the phase difference between the input signal and the delayed input signal in a second position.

3. The synchronization circuit of claim 1, comprising a plurality of playback modules, each of which is adapted to receive the manipulated value and produce an output that has a phase relationship with respect to the output of one of the other of the plurality of playback modules that is dependent on the manipulated value.

4. The synchronization circuit of claim 3 wherein the phase relationship is proportional to the manipulated value.

5. The synchronization circuit of claim 3 wherein the phase relationship is proportional to the number of the plurality of playback modules.

6. The synchronization circuit of claim 1 wherein the manipulation circuit comprises a divider circuit.

7. The synchronization circuit of claim 1, comprising a multiplexer that presents either the input signal or the delayed input signal to the measuring circuit.

8. A synchronization circuit that is adapted to receive an input signal, the synchronization circuit comprising:
   a delay monitor adapted to produce a delayed input signal;
   a measuring circuit adapted to measure the period of the input signal and a phase difference between the input signal and the delayed input signal;
   a timing switch adapted to (a) cause a value corresponding to the period of the input signal to be stored in a first location and (b) cause a value corresponding to the phase difference between the input signal and the delayed input signal to be stored in a second location;

a manipulation circuit adapted to manipulate the value corresponding to the period of the input signal to produce a manipulated value; and a reconstruction circuit adapted to receive the manipulated value and the value corresponding to the phase difference between the input signal and the delayed input signal and to produce a signal having a duty cycle that corresponds to the manipulated value.

9. The synchronization circuit of claim 8, comprising a plurality of playback modules, each of which is adapted to receive the manipulated value and produce an output that has a phase relationship with respect to the output of one of the other of the plurality of playback modules that is dependent on the manipulated value.

10. The synchronization circuit of claim 9 wherein the phase relationship is proportional to the manipulated value.

11. The synchronization circuit of claim 9 wherein the phase relationship is proportional to the number of the plurality of playback modules.

12. The synchronization circuit of claim 8 wherein the manipulation circuit comprises a divider circuit.

13. The synchronization circuit of claim 8, comprising a multiplexer that presents either the input signal or the delayed input signal to the measuring circuit.

14. A synchronization circuit that is adapted to receive an input signal, the synchronization circuit comprising:
    means for producing a delayed input signal;
    means for measuring the period of the input signal;
    means for measuring a phase difference between the input signal and the delayed input signal;
    means for manipulating the period of the input signal to produce a manipulated value; and
    means for producing a signal having a duty cycle that correspondsto the manipulated value receiving the manipulated value based on the phase difference between the input signal and the delayed input signal.

15. The synchronization circuit of claim 14, comprising means for measuring the period of the input signal in a first position and for measuring the phase difference between the input signal and the delayed input signal in a second position.

16. The synchronization circuit of claim 14, comprising a plurality of means for receiving the manipulated value and producing an output that has a phase relationship that is dependent on the manipulated value with respect to the output of one of the other of the plurality of means for receiving.

17. The synchronization circuit of claim 16 wherein the phase relationship is proportional to the manipulated value.

18. The synchronization circuit of claim 16 wherein the phase relationship is proportional to the number of the plurality of playback modules.

19. The synchronization circuit of claim 14 wherein the means for manipulating comprises a divider circuit.

20. An integrated circuit device comprising a synchronization circuit adapted to receive an input signal, the synchronization circuit comprising:
    a delay monitor adapted to produce a delayed input signal;
    a measuring circuit adapted to measure the period of the input signal and a phase difference between the input signal and the delayed input signal;
    a manipulation circuit adapted to manipulate the period of the input signal to produce a manipulated value; and
    a reconstruction circuit adapted to receive the manipulated value and the phase difference between the input signal and the delayed input signal and to produce a signal having a duty cycle that corresponds to the manipulated value.

21. The integrated circuit device of claim 20, comprising a timing switch adapted to (a) measure the period of the input signal in a first position and (b) measure the phase difference between the input signal and the delayed input signal in a second position.

22. The integrated circuit device of claim 20, comprising a plurality of playback modules, each of which is adapted to receive the manipulated value and produce an output that has a phase relationship with respect to the output of one of the other of the plurality of playback modules that is dependent on the manipulated value.

23. The integrated circuit device of claim 22 wherein the phase relationship is proportional to the manipulated value.

24. The integrated circuit device of claim 22 wherein the phase relationship is proportional to the number of the plurality of playback modules.

25. The integrated circuit device of claim 20, wherein the manipulation circuit comprises a divider circuit.

26. The integrated circuit device of claim 20, comprising a multiplexer that presents either the input signal or the delayed input signal to the measuring circuit.

27. An integrated circuit device comprising a synchronization circuit adapted to receive an input signal, the synchronization circuit comprising:
    a delay monitor adapted to produce a delayed input signal;
    a measuring circuit adapted to measure the period of the input signal and a phase difference between the input signal and the delayed input signal;
    a timing switch adapted to (a) cause a value corresponding to the period of the input signal to be stored in a first location and (b) cause a value corresponding to the phase difference between the input signal and the delayed input signal to be stored in a second location;
    a manipulation circuit adapted to manipulate the value corresponding to the period of the input signal to produce a manipulated value; and
    a reconstruction circuit adapted to receive the manipulate value and the value corresponding to the phase difference between the input signal and the delayed input signal and to produce a signal having a duty cycle that corresponds to the manipulated value.

28. The integrated circuit device of claim 27, comprising a plurality of playback modules, each of which is adapted to receive the manipulated value and produce an output that has a phase relationship with respect to the output of one of the other of the plurality of playback modules that is dependent on the manipulated value.

29. The integrated circuit device of claim 28 wherein the phase relationship is proportional to the manipulated value.

30. The integrated circuit device of claim 28 wherein the phase relationship is proportional to the number of the plurality of playback modules.

31. The integrated circuit device of claim 27 wherein the manipulation circuit comprises a divider circuit.

32. The integrated circuit device of claim 27, comprising a multiplexer that presents either the input signal or the delayed input signal to the measuring circuit.

33. An electronic device, comprising:
    a processor;
    a power supply adapted to provide power to the processor;
    a user input device adapted to receive input from a user and provides the input to the processor;
    a display device adapted to display information; and a memory device that comprises a synchronization circuit, the synchronization circuit comprising:
  a delay monitor adapted to produce a delayed input signal; and
  a measuring circuit adapted to measure the period of the input signal and a phase difference between the input signal and the delayed input signal;
  a manipulation circuit adapted to manipulate the period of the input signal to produce a manipulated value; and
  a reconstruction circuit adapted to receive the manipulated value and the phase difference between the input signal and the delayed input signal and to produce a signal having a duty cycle that corresponds to the manipulated value.

34. The electronic device of claim 33, wherein the synchronization circuit comprises a timing switch adapted to (a) measure the period of the input signal in a first position and (b) measure the phase difference between the input signal and the delayed input signal in a second position.

35. The electronic device of claim 33, wherein the synchronization circuit comprises a plurality of playback modules, each of which is adapted to receive the manipulated value and produce an output that has a phase relationship with respect to the output of one of the other of the plurality of playback modules that is dependent on the manipulated value.

36. The electronic device of claim 35 wherein the phase relationship is proportional to the manipulated value.

37. The electronic device of claim 35 wherein the phase relationship is proportional to the number of the plurality of playixick modules.

38. The electronic device of claim 33 wherein the manipulation circuit comprises a divider circuit.

39. The electronic device of claim 33, wherein the synchronization circuit comprises a multiplexer that presents either the input signal or the delayed input signal to the measuring circuit.

40. An electronic device, comprising:
  a processor;
  a power supply adapted to provide power to the processor;
  a user input device adapted to receive input from a user and provides the input to the processor;
  a display device adapted to display information; and
  a memory device that comprises a synchronization circuit, the synchronization circuit comprising:
    a delay monitor adapted to produce a delayed input signal;
    a measuring circuit adapted to measure the period of the input signal and a phase difference between the input signal and the delayed input signal;
    a timing switch adapted to (a) cause a value corresponding to the period of the input signal to be stored in a first location and (b) cause a value corresponding to the phase difference between the input signal and the delayed input signal to be stored in a second location;
    a manipulation circuit adapted to manipulate the value corresponding to the period of the input signal to produce a manipulated value; and
    a reconstruction circuit adapted to receive the manipulated value and the value corresponding to the phase difference between the input signal and the delayed input signal and to produce a signal having a duty cycle that corresponds to the manipulated value.

41. The electronic device of claim 40, wherein the synchronization circuit comprises a plurality of play back modules, each of which is adapted to receive the manipulated value and produce an output that has a phase relationship with respect to the output of one of the other of the plurality of play back modules that is dependent on the manipulated value.

42. The electronic device of claim 41 wherein the phase relationship is proportional to the manipulated value.

43. The electronic device of claim 41 wherein the phase relationship is proportional to the number of the plurality of play back modules.

44. The electronic device of claim 40 wherein the manipulation circuit comprises a divider circuit.

45. The electronic device of claim 42, wherein the synchronization circuit comprises a multiplexer that presents either the input signal or the delayed input signal to the measuring circuit.

46. A method of producing a signal comprising the acts of:
  receiving an input signal;
  producing a delayed input signal;
  measuring the period of the input signal;
  measuring a phase difference between the input signal and the delayed input signal;
  manipulating the period of the input signal to produce a manipulated value; and
  constructing a signal based on the manipulated value and the phase difference between the input signal and the delayed input signal.

47. The method of claim 46 wherein the act of manipulating comprises dividing the period of the input signal by a number.

48. The method of claim 46, comprising multiplexing the input signal and the delayed input signal.

49. The method of claim 46 wherein the recited acts are performed in the recited order.

50. A method of producing a plurality of output signals comprising the acts of:
  receiving an input signal;
  producing a delayed input signal;
  measuring the period of the input signal;
  measuring a phase difference between the input signal and the delayed input signal;
  manipulating the period of the input signal to produce a manipulated value; and
  generating a plurality of synchronized output signals based on the manipulated value and the phase difference between the input signal and the delayed input signal.

51. The method of claim 50 wherein the act of manipulating comprises dividing the period of the input signal by a number.

52. The method of claim 50, comprising multiplexing the input signal and the delayed input signal.

53. The method of claim 50 wherein the output signals have a phase relationship with respect to each other that is proportional to the manipulated value.

54. The method of claim 50 wherein the output signals have a phase relationship with respect to each other that is proportional to the number of the plurality of output signals.

55. The method of claim 50 wherein the recited acts are performed in the recited order.

* * * * *